US012184961B2

(12) United States Patent
Pu et al.

(10) Patent No.: US 12,184,961 B2
(45) Date of Patent: Dec. 31, 2024

(54) IMAGE SENSING DEVICE AND HEAD-MOUNTED DISPLAY

(71) Applicant: HTC Corporation, Taoyuan (TW)

(72) Inventors: Ta-Chun Pu, Taoyuan (TW); Chun-Yih Wu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 157 days.

(21) Appl. No.: 17/884,572

(22) Filed: Aug. 10, 2022

(65) Prior Publication Data
US 2024/0056664 A1 Feb. 15, 2024

(51) Int. Cl.
H04N 23/55 (2023.01)
G02B 7/02 (2021.01)
H01Q 1/27 (2006.01)
H04N 23/667 (2023.01)
H04N 23/53 (2023.01)

(52) U.S. Cl.
CPC ............ H04N 23/55 (2023.01); G02B 7/023 (2013.01); H01Q 1/273 (2013.01); H04N 23/667 (2023.01); H04N 23/53 (2023.01)

(58) Field of Classification Search
None
See application file for complete search history.

(56) References Cited

U.S. PATENT DOCUMENTS

| 2002/0106204 | A1* | 8/2002 | Miyamaru | G02B 7/04 396/89 |
| 2007/0182812 | A1* | 8/2007 | Ritchey | H04N 23/698 348/36 |
| 2020/0067188 | A1* | 2/2020 | Pu | H01Q 3/44 |
| 2022/0109245 | A1* | 4/2022 | Yang | H01Q 3/245 |

FOREIGN PATENT DOCUMENTS

TW 202045981 12/2020

OTHER PUBLICATIONS

"Office Action of Taiwan Counterpart Application", issued on Mar. 21, 2024, p. 1-p. 6.

* cited by examiner

Primary Examiner — Eileen M Adams
(74) Attorney, Agent, or Firm — JCIPRNET

(57) ABSTRACT

An image sensing device includes a frame body, a lens group, a position adjuster, multiple antenna elements, and an image sensing element. The frame body has an accommodating space. The lens group is disposed in the accommodating space. The position adjuster is connected between the lens group and the frame body, and configured to allow the lens group to move in the accommodating space. The antenna elements are disposed on a second side of the lens group, and configured to provide sensing beams to a target area. The image sensing element is disposed on the second side of the lens group, and configured to sense reflected light beams of the target area. In addition, a head-mounted display device is also provided.

18 Claims, 5 Drawing Sheets

IMAGE SENSING DEVICE AND HEAD-MOUNTED DISPLAY

BACKGROUND

Technical Field

The disclosure relates to an electronic device, and more particularly, to an image sensing device and a head-mounted display device.

Description of Related Art

With the increasing development of the technology industry, the types, functions, and ways of use of electronic devices are becoming more and more diverse, and wearable electronic devices that may be directly worn on a user's body are also born accordingly. There are quite a few types of head-mounted display devices. Taking head-mounted electronic devices such as goggles as an example, after wearing such an electronic device, in addition to seeing stereoscopic images, the images may further change as the user's head turns, providing a more immersive experience for the user.

However, in the current head-mounted electronic device design, there are various modules with different functions in the structure, resulting in the high volume of the head-mounted electronic device. In addition, at this stage of development, the coverage of radar beams or the diversity characteristics of radar beams are limited by the limited number of antenna elements, and specific positions on the head-mounted electronic device need to be disposed with image and radar sensors at the same time.

SUMMARY

The disclosure provides an image sensing device and a head-mounted display device, which may allow an antenna and an image sensing element to be integrated into a single module to form an optimal sensing position and increase different beam directions.

The disclosure provides an image sensing device, which includes a frame body, a lens group, a position adjuster, multiple antenna elements, and an image sensing element. The frame body has an accommodating space. The lens group is disposed in the accommodating space. The position adjuster is connected between the lens group and the frame body, and configured to allow the lens group to move in the accommodating space. The antenna elements are disposed on a second side of the lens group, and configured to provide sensing beams to a target area. The image sensing element is disposed on the second side of the lens group, and configured to sense reflected light beams of the target area.

The disclosure further provides a head-mounted display device, which includes an image sensing device and a display. The image sensing device includes a frame body, a lens group, a position adjuster, multiple antenna elements, and an image sensing element. The frame body has an accommodating space. The lens group is disposed in the accommodating space. The position adjuster is connected between the lens group and the frame body, and configured to allow the lens group to move in the accommodating space. The antenna elements are disposed on a second side of the lens group, and configured to provide sensing beams to a target area. The image sensing element is disposed on the second side of the lens group, and configured to sense reflected light beams of the target area. The display is electrically connected to the image sensing device.

Based on the above, in the image sensing device and the head-mounted display device of the disclosure, the image sensing device includes a frame body, a lens group, a position adjuster, multiple antenna elements, and an image sensing element. The position adjuster is connected between the lens group and the frame body, and configured to allow the lens group to move in the accommodating space. The sensing beams provided by the antenna elements are transmitted through the lens group to the target area to form scanning beams, and the reflected beams reflected from the target area are transmitted through the lens group to the image sensing element. Therefore, by configuring the antenna elements adjacent to the lens group, the reflected beams provided by the target area and the sensing beams provided by the antenna elements may share the lens group, which may further be integrated into a single module to form the optimal sensing position, while saving the volume of the device. In addition, by configuring the position adjuster to move the lens group, an optical shock-absorbing effect may be provided and different beam directions may be added to the scanning beam.

In order to make the aforementioned features and advantages of the disclosure comprehensible, embodiments accompanied with drawings are described in detail as follows.

DESCRIPTION OF THE EMBODIMENTS

Figure 1:
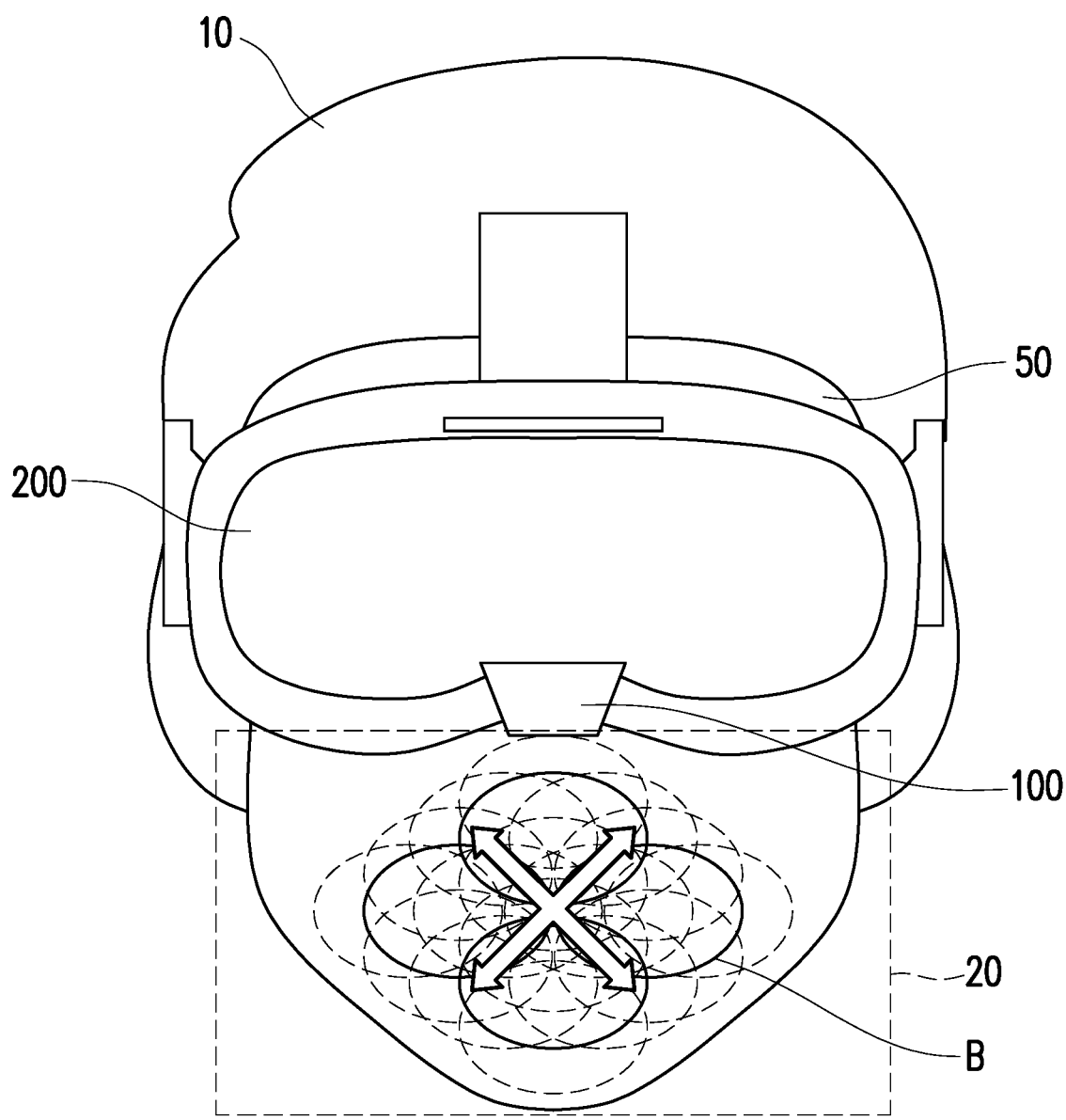
FIG. 1 is a schematic diagram of a head-mounted display device according to an embodiment of the disclosure.

FIG. 1 is a schematic diagram of a head-mounted display device according to an embodiment of the disclosure. Please refer to FIG. 1. An embodiment of the disclosure provides a head-mounted display device 50, which may be worn by a user 10 to achieve the effect of experiencing virtual reality, augmented reality or mixed reality. In the embodiment, the head-mounted display device 50 includes an image sensing device 100 and a display 200. The image sensing device 100 is configured to sense a target area 20. The display 200 is electrically connected to the image sensing device 100, and configured to generate an image screen according to a sensing result of the image sensing device 100.

Figure 2:
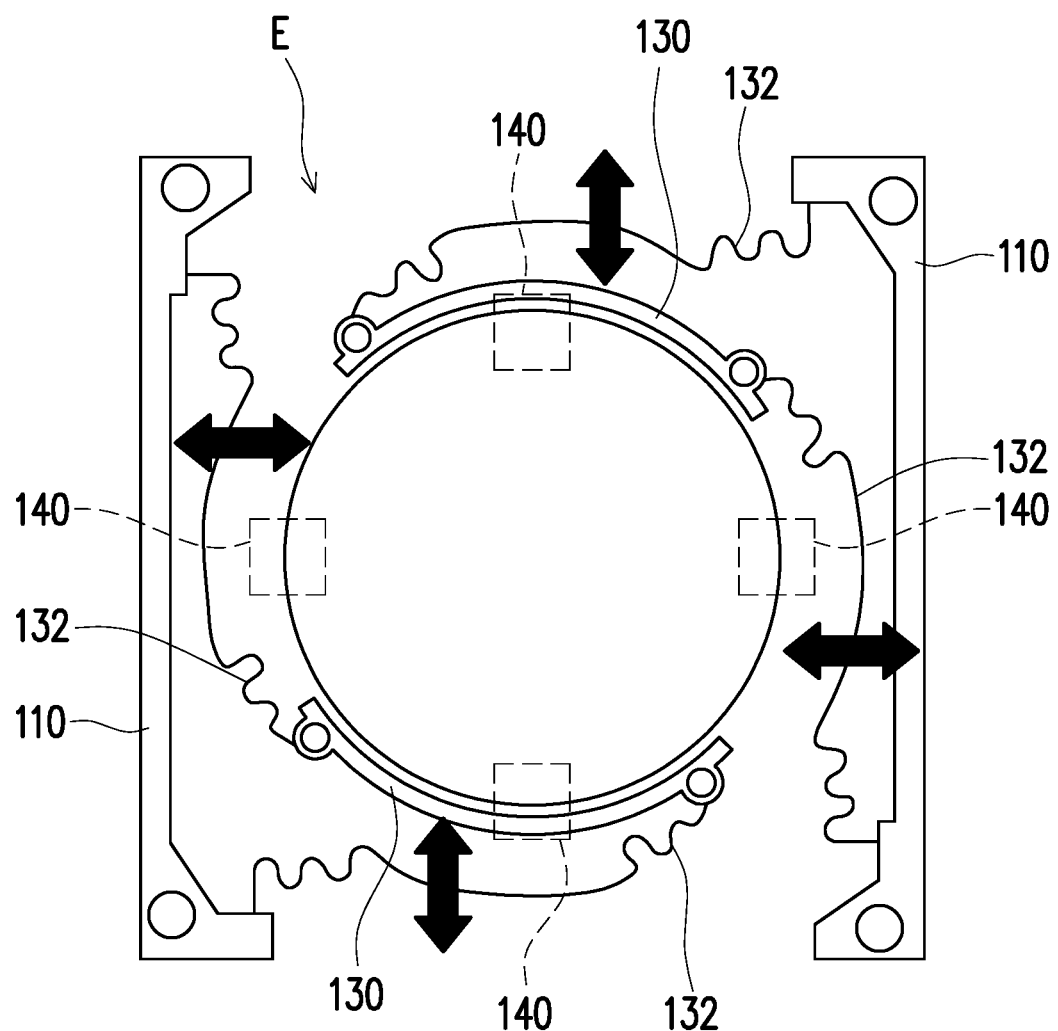
FIG. 2 is a schematic diagram of the image sensing device of the head-mounted display device of FIG. 1.
Figure 3A:
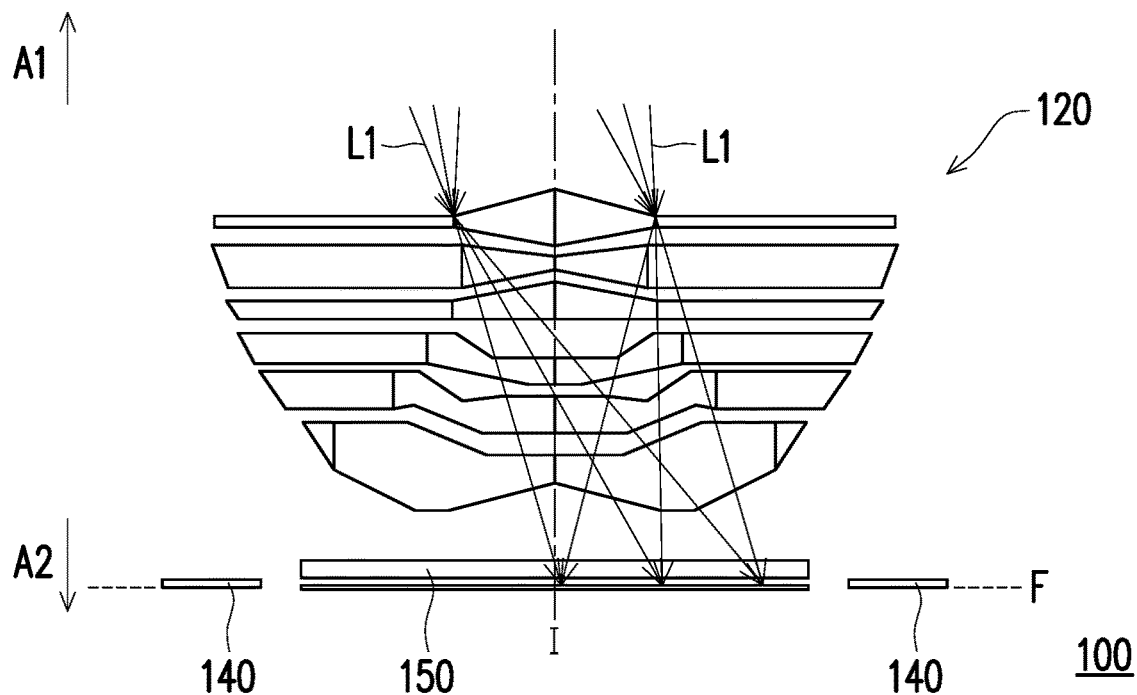
FIGS. 3A and 3B are schematic diagrams of the image sensing device of FIG. 2 in different states, respectively.
Figure 3B:
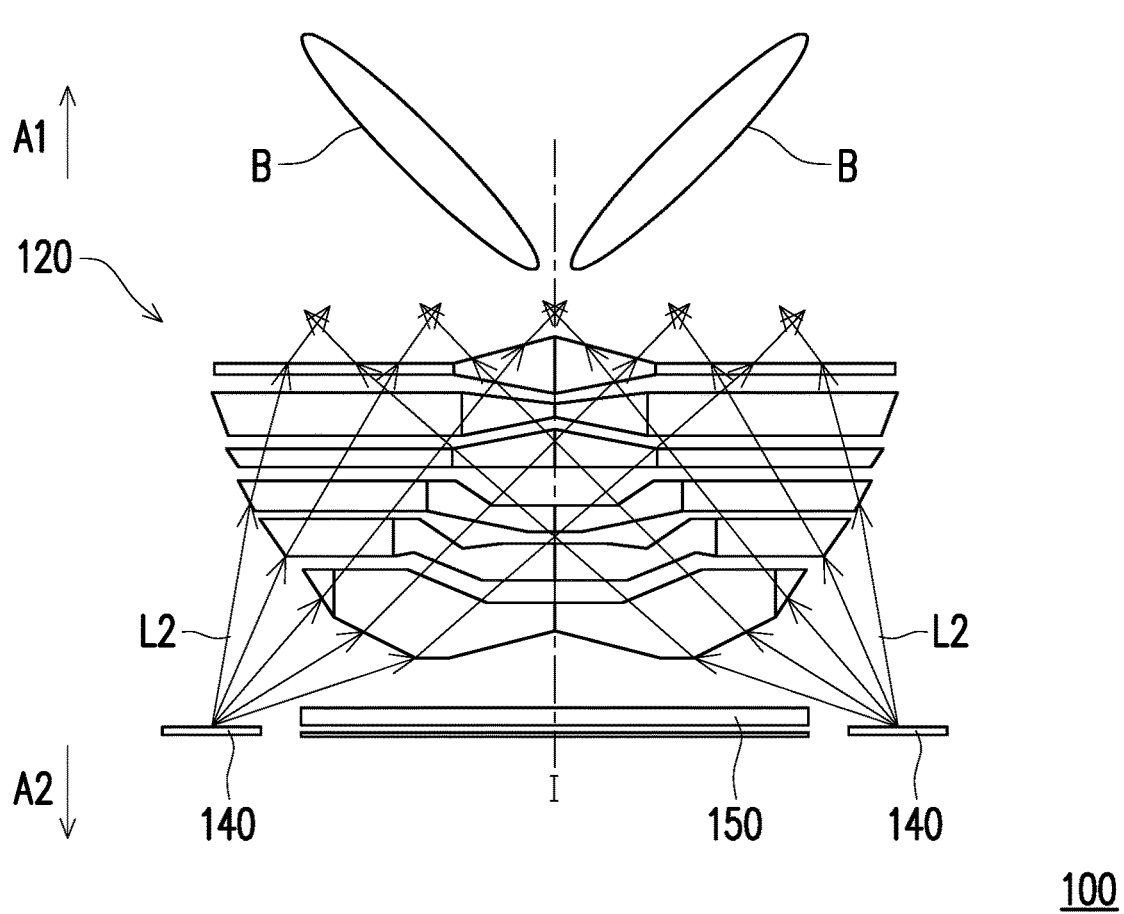

FIG. 2 is a schematic diagram of the image sensing device of the head-mounted display device of FIG. 1. FIGS. 3A and 3B are schematic diagrams of the image sensing device of FIG. 2 in different states, respectively. Please refer to FIGS. 1, 2, and 3A at the same time. In the embodiment, the image sensing device 100 includes a frame body 110, a lens group 120, a position adjuster 130, multiple antenna elements 140, and an image sensing element 150. The frame body 110 has an accommodating space E, and the lens group 120 is disposed in the accommodating space E. The frame body 110 is connected to other structures of the head-mounted display device 50, such as a casing. The lens group 120 includes an optical axis I and multiple lens elements 122 arranged along the optical axis I. For example, the lens group 120 includes, for example, a combination of one or more optical lenses having diopters, such as various combinations of non-planar lenses, including biconcave lenses, biconvex lenses, concave-convex lenses, convex-concave lenses, plano-convex lenses, and plano-concave lenses. In the embodiment, the lens elements 122 are arranged along the optical axis I, as shown in FIG. 3A. The image sensing element 150 is disposed on a second side A2 of the lens group 120, and may be configured to sense reflected light beams L1 of the target area 20, thereby optically imaging the facial appearance of the target area 20 of the user 10. Specifically, the reflected light beam L1 emitted from the target area 20 is transmitted from a first side A1 to the second side A2 through the lens group 120 to the image sensing element 150, and the direction of the second side A2 is opposite to the direction of the first side A1.

Please refer to FIGS. 1, 2, and 3B. The antenna elements 140 are disposed on the second side A2 of the lens group 120, and configured to provide sensing beams L2 to the target area 20 to form scanning beams B having specific directions. Specifically, the sensing beam L2 provided by the antenna element 140 is transmitted through the lens group 120 to the target area 20 from the second side A2 to the first side A1, and the direction of the second side A2 is opposite to the direction of the first side A1. In the embodiment, for example, four antenna elements 140 are disposed, and orthographic projections of the antenna elements 140 on a reference plane F surround an orthographic projection of the lens group 120 on the reference plane F. The extension direction of the reference plane F is perpendicular to the extension direction of the optical axis I, and the orthographic projections of the antenna elements 140 are evenly distributed around the orthographic projection of the lens group 120, but the disclosure is not limited thereto. In the embodiment, the sensing beams L2 respectively provided by the antenna elements 140 may be transmitted to different surface areas of the target area 20 by the optical effect of the lens group 120 (i.e., irradiation areas of the scanning beams B, as shown in FIG. 1). In other words, in the image sensing device 100 of the embodiment, the antenna elements 140 are disposed adjacent to the lens group 120, so that the reflected light beams L1 provided by the target area 20 and the sensing beams L2 provided by the antenna elements 140 may share the lens group 120. In this way, the antenna elements 140 and the image sensing element 150 may be integrated into a single module to form a better sensing position, and the volume of the device may be saved at the same time.

Figure 4:
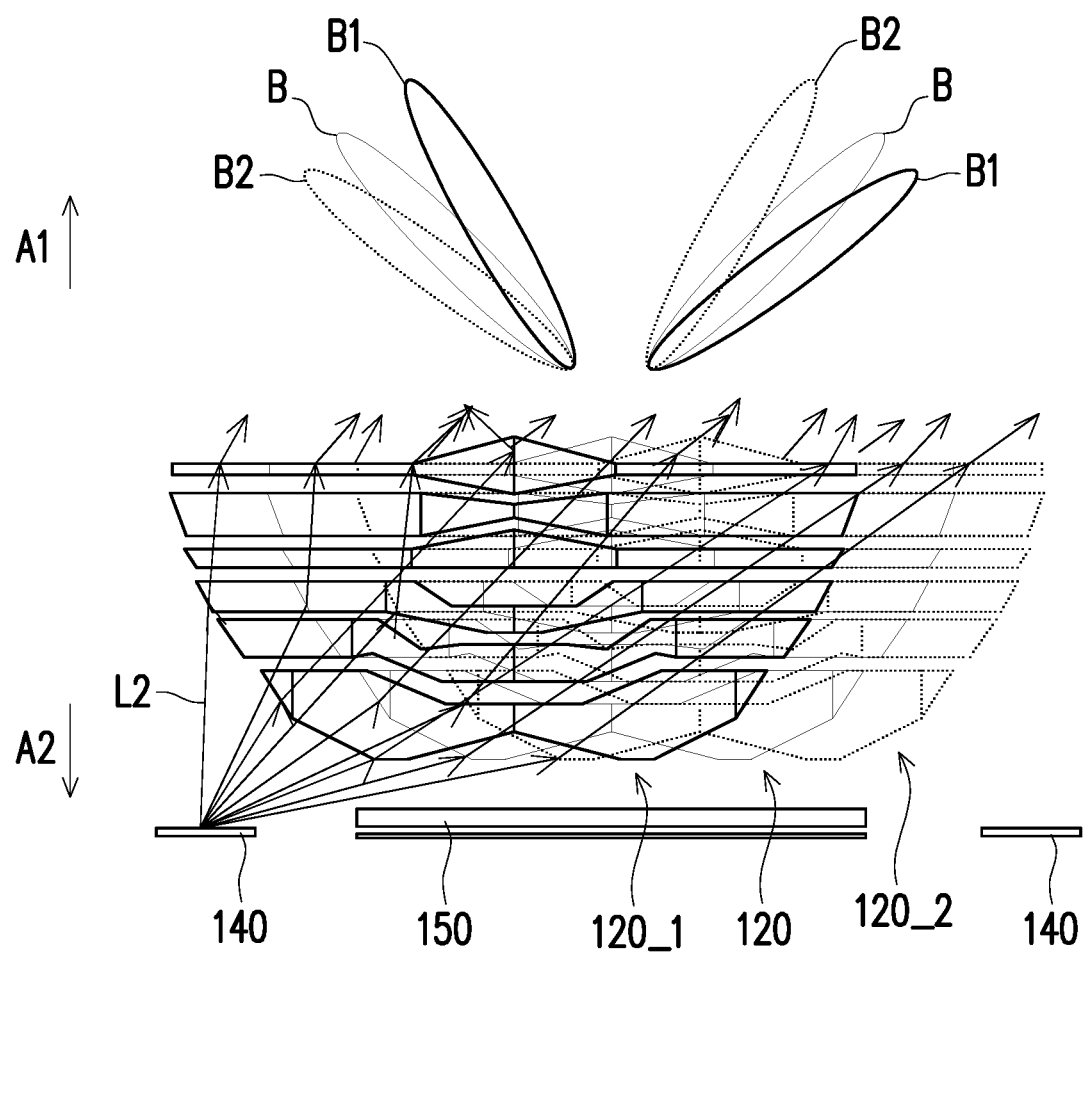
FIG. 4 is a schematic diagram of a lens group of an image sensing device when moving according to an embodiment of the disclosure.

FIG. 4 is a schematic diagram of a lens group of an image sensing device when moving according to an embodiment of the disclosure. Please refer to FIGS. 1, 2, and 4. The position adjuster 130 is connected between the lens group 120 and the frame body 110, and the lens group 120 is adapted to move in the accommodating space E by the position adjuster 130. For example, in the embodiment, the position adjuster 130 includes multiple elastic members 132, which are respectively connected between the frame body 110 and the lens group 120. The elastic members 132 are configured to provide a shock-absorbing function to the lens group 120, which may slow down the vibration of the lens group 120. The embodiment may further improve the optical precision of the image sensing device 100 by the shock-absorbing function provided by the position adjuster 130. In addition, in the embodiment, the image sensing device 100 further includes a micro-electromechanical system (MEMS, not shown), which is electrically connected to the position adjuster 130. The MEMS controls the position adjuster 130 to move the position of the lens group 120 in the accommodating space E. In other words, in the embodiment, the position adjuster 130 may not only provide a passive shock-absorbing function to the lens group 120, but also actively move the position of the lens group 120 under the control of the MEMS.

It is worth mentioning that the sensing beam L2 provided by the antenna element 140 may be moved in the accommodating space E through the lens group 120 to change the beam direction of the sensing beam L2. As shown in FIG. 4, when the position of the lens group 120 is not changed, the antenna element 140 provides the scanning beam B in a beam direction. And when the position of the lens group 120 is changed to a position 120_1, the antenna element 140 provides a scanning beam B1 of another beam direction. When the position of the lens group 120 is changed to a position 120_2, the antenna element 140 provides a scanning beam B2 of the third different beam direction. In this way, the beam direction of the scanning beam B may be further adjusted by moving the position of the lens group 120, thereby generating the scanning beams B, B1, and B2 with different beam directions. Therefore, the sensing effect may be improved by switching the scanning beams B, B1, and B2 of the beam directions.

Figure 5:
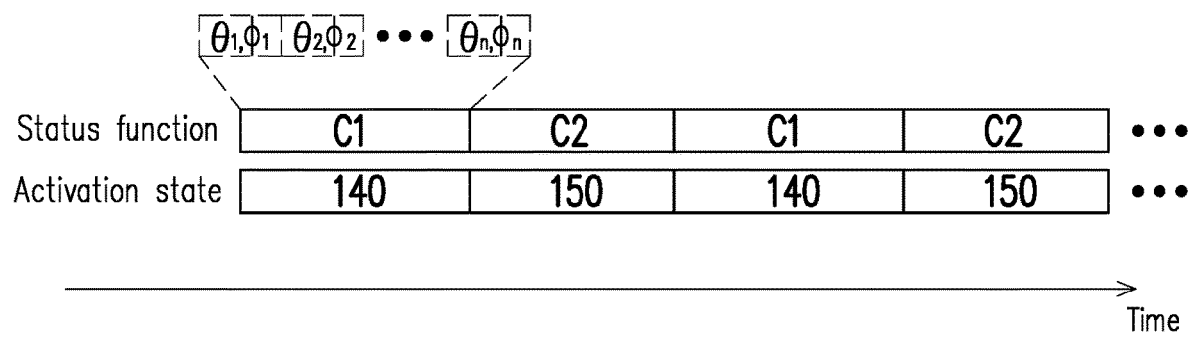
FIG. 5 is a timing diagram showing that an image sensing device according to an embodiment of the disclosure switches to a first mode and a second mode according to the timing sequence.

FIG. 5 is a timing diagram showing that an image sensing device according to an embodiment of the disclosure switches to a first mode and a second mode according to the timing sequence. Please refer to FIGS. 1, 4, and 5. In one embodiment, the image sensing device 100 may switch the moving state of the lens group 120 in sequence. Specifically, the image sensing device 100 is switched to the first mode and the second mode in sequence, and in the first mode, the image sensing device 100 activates the antenna elements 140 and further activates the MEMS to move the lens group 120. Therefore, in the first mode, the sensing beam L2 changes the beam direction through the movement of the lens group 120 in the accommodating space E, thereby changing the beam direction and the irradiation range of the scanning beam B on the target area 20. In the second mode, the image sensing device 100 activates the image sensing element 150 to receive visible light. In other words, when the image sensing device 100 is switched to the first mode, the image sensing element 150 is turned off and the antenna elements 140 and the MEMS are activated. At this time, the lens group 120 moves actively and has the projected scanning beam B for performing a radar scanning function C1. When the image sensing device 100 is switched to the second mode, the image sensing element 150 is activated and the antenna elements 140 and the MEMS are turned off. At this time, the lens group 120 moves inactively and has a shock-absorbing function C2. In this way, the effect of switching the radar scanning function C1 and the shock-absorbing function C2 at any time may be achieved by switching and activating different elements continuously. In addition, when the radar scanning function C1 is performed, since the MEMS continuously moves the lens group 120 to different positions, the direction and phase of the scanning beam B may also be gradually changed at any time, thereby enhancing the diversity of the scanning beam B, as shown in FIG. 5.

To sum up, in the image sensing device and the head-mounted display device of the disclosure, the image sensing device includes a frame body, a lens group, a position adjuster, multiple antenna elements, and an image sensing element. The position adjuster is connected between the lens group and the frame body, and configured to allow the lens group to move in the accommodating space. The sensing beams provided by the antenna elements are transmitted through the lens group to the target area to form the scanning beams, and the reflected beams reflected from the target area are transmitted through the lens group to the image sensing element. Therefore, by configuring the antenna elements adjacent to the lens group, the reflected beams provided by the target area and the sensing beams provided by the antenna elements may share the lens group, which may further be integrated into a single module to form the optimal sensing position, while saving the volume of the device. In addition, by configuring the position adjuster to move the lens group, the optical shock-absorbing effect may be provided and different beam directions may be added to the scanning beam.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. An image sensing device, comprising:
a frame body, having an accommodating space; a lens group, disposed in the accommodating space, the lens group has a first side and a second side opposite to each other; a position adjuster, connected between the lens group and the frame body, and configured to allow the lens group to move in the accommodating space; a plurality of antenna elements, disposed on the second side of the lens group, and the plurality of antenna elements configured to provide sensing beams to a target area,
wherein the target area is located on the first side of the lens group, and the sensing beam is transmitted through the lens group to the target area from the second side to the first side; and an image sensing element, disposed on the second side of the lens group, and the image sensing element configured to sense reflected light beams of the target area, wherein the reflected light beam emitted from the target area is transmitted from the first side to the second side of the lens group.

2. The image sensing device according to claim 1, wherein the lens group comprises an optical axis and a plurality of lens elements, the plurality of lens elements are arranged along the optical axis.

3. The image sensing device according to claim 1, wherein the position adjuster comprises a plurality of elastic members, which are respectively connected between the frame body and the lens group.

4. The image sensing device according to claim 3, further comprising:
a micro-electromechanical system (MEMS), electrically connected to the position adjuster, and configured to control the position adjuster to move a position of the lens group in the accommodating space.

5. The image sensing device according to claim 4, wherein the image sensing device is switched to a first mode and a second mode in sequence, in the first mode, the image sensing device activates the plurality of antenna elements, and in the second mode, the image sensing device activates the image sensing element.

6. The image sensing device according to claim 5, wherein in the first mode, the image sensing device further activates the MEMS to control the position adjuster to move the lens group.

7. The image sensing device according to claim 1, wherein the sensing beam moves in the accommodating space through the lens group to change a beam direction and an irradiation range on the target area.

8. The image sensing device according to claim 1, wherein orthographic projections of the plurality of antenna elements on a reference plane surround an orthographic projection of the lens group on the reference plane, the lens group comprises an optical axis, and an extension direction of the reference plane is perpendicular to an extension direction of the optical axis.

9. The image sensing device according to claim 1, wherein the sensing beams respectively provided by the plurality of antenna elements are transmitted to different surface areas of the target area.

10. A head-mounted display, comprising:
an image sensing device, comprising: a frame body, having an accommodating space; a lens group, disposed in the accommodating space, the lens group has a first side and a second side opposite to each other; a position adjuster, connected between the lens group and the frame body, and configured to allow the lens group to move in the accommodating space; a plurality of antenna elements, disposed on the second side of the lens group, and the plurality of antenna elements configured to provide sensing beams to a target area,
wherein the target area is located on the first side of the lens group; an image sensing element, disposed on the second side of the lens group, and the image sensing element configured to sense reflected light beams of the target area; and a display, electrically connected to the image sensing device.

11. The head-mounted display device according to claim 10, wherein the lens group comprises an optical axis and a plurality of lens elements, the plurality of lens elements are arranged along the optical axis.

12. The head-mounted display device according to claim 10, wherein the position adjuster comprises a plurality of elastic members, which are respectively connected between the frame body and the lens group.

13. The head-mounted display device according to claim 12, wherein the image sensing device further comprises a micro-electromechanical system (MEMS), which is electrically connected to the position adjuster, and configured to control the position adjuster to move a position of the lens group in the accommodating space.

14. The head-mounted display device according to claim 13, wherein the image sensing device is switched to a first mode and a second mode in sequence, in the first mode, the image sensing device activates the plurality of antenna elements, and in the second mode, the image sensing device activates the image sensing element.

15. The head-mounted display device according to claim 14, wherein in the first mode, the image sensing device further activates the MEMS to control the position adjuster to move the lens group.

16. The head-mounted display device according to claim 10, wherein the sensing beam moves in the accommodating space through the lens group to change a beam direction and an irradiation range on the target area.

17. The head-mounted display device according to claim 10, wherein orthographic projections of the plurality of antenna elements on a reference plane surround an orthographic projection of the lens group on the reference plane, the lens group comprises an optical axis, and an extension direction of the reference plane is perpendicular to an extension direction of the optical axis.

18. The head-mounted display device according to claim 10, wherein the sensing beams respectively provided by the plurality of antenna elements are transmitted to different surface areas of the target area.

* * * * *